(12) United States Patent
Weng et al.

(10) Patent No.: US 9,792,725 B2
(45) Date of Patent: Oct. 17, 2017

(54) METHOD FOR IMAGE AND VIDEO VIRTUAL HAIRSTYLE MODELING

(71) Applicant: ZHEJIANG UNIVERSITY, Hangzhou (CN)

(72) Inventors: Yanlin Weng, Hangzhou (CN); Menglei Chai, Hangzhou (CN); Lvdi Wang, Hangzhou (CN); Kun Zhou, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 66 days.

(21) Appl. No.: 14/536,571

(22) Filed: Nov. 7, 2014

(65) Prior Publication Data

US 2015/0054825 A1   Feb. 26, 2015

Related U.S. Application Data (63) Continuation of application No. PCT/CN2013/075129, filed on May 3, 2013.

(30) Foreign Application Priority Data

Feb. 2, 2013   (CN) .......................... 2013 1 0047151

(51) Int. Cl.
*G06T 17/00* (2006.01)
*G06T 19/00* (2011.01)
(Continued)

(52) U.S. Cl.
CPC .............. *G06T 17/00* (2013.01); *G06T 7/251* (2017.01); *G06T 7/75* (2017.01); *G06T 19/00* (2013.01);
(Continued)

(58) Field of Classification Search
CPC ...................................................... G06T 17/00
See application file for complete search history.

(56) References Cited

U.S. PATENT DOCUMENTS

| 7,468,730 B2 | 12/2008 | Petrovic et al. ............... 345/473 |
| 8,238,639 B2 * | 8/2012 | Silver .................. G06K 9/6202 382/103 |

(Continued)

FOREIGN PATENT DOCUMENTS

| CN | 101344373 A | 1/2009 |
| CN | 102419868 A | 4/2012 |

(Continued)

OTHER PUBLICATIONS

Video-Based Modeling of Dynamic Hair, Yamaguchi et al., 2009.*
(Continued)

*Primary Examiner* — Barry Drennan
*Assistant Examiner* — Phong Nguyen
(74) *Attorney, Agent, or Firm* — J.C. Patents (57) ABSTRACT

The invention discloses a method for image and video virtual hairstyle modeling, including: performing data acquisition for a target subject by using a digital device and obtaining a hairstyle region from an image by segmenting; obtaining a uniformly distributed static hairstyle model which conforms to the original hairstyle region by solving an orientation ambiguity problem of an image hairstyle orientation field, calculating a movement of the hairstyle in a video by tracing a movement of a head model and estimating non-rigid deformation, generating a dynamic hairstyle model in every moment during the moving process, so that the dynamic hairstyle model fits the real movement of the hairstyle in the video naturally. The method is used to perform virtual 3D model reconstruction with physical rationality for individual hairstyles in single-views and video sequences, and widely applied in creating virtual characters (Continued)

and many hairstyle editing applications for images and videos.

4 Claims, 2 Drawing Sheets

(51) Int. Cl.
    *G06T 7/73*                   (2017.01)
    *G06T 7/246*               (2017.01)
(52) U.S. Cl.
    CPC ............... *G06T 2200/08* (2013.01); *G06T 2207/30196* (2013.01)

(56) References Cited

U.S. PATENT DOCUMENTS

| | | | | |
|---|---|---|---|---|
| 9,036,898 | B1* | 5/2015 | Beeler | G06T 19/20 382/154 |
| 2009/0153569 | A1* | 6/2009 | Park | G06T 7/2046 345/474 |
| 2009/0284529 | A1* | 11/2009 | De Aguiar | G06T 13/40 345/420 |
| 2011/0002544 | A1* | 1/2011 | Oshima | G06K 9/6211 382/190 |
| 2011/0216070 | A1* | 9/2011 | Witkin | G06T 13/40 345/442 |
| 2012/0313937 | A1* | 12/2012 | Beeler | G06T 19/00 345/419 |
| 2013/0129141 | A1* | 5/2013 | Wang | G06K 9/00 382/103 |

FOREIGN PATENT DOCUMENTS

| | | | |
|---|---|---|---|
| CN | 102663820 | A | 9/2012 |
| CN | 102800129 | B | 9/2015 |
| CN | 103606186 | B | 3/2016 |
| JP | 04-344575 | A | 12/1992 |

OTHER PUBLICATIONS

Multi-View Hair Capture using Orientation Fields, Luo et al., 2012.*
Sketching Hairstyles, Fu et al., 2007.*
A Statistical Wisp Model and Pseudophysical Approaches for Interactive Hairstyle Generation, Choe et al., 2005.*
Marker-less Deformable Mesh Tracking for Human Shape and Motion Capture, Aguiar et al., 2007.*
Paris et all, "Capture of Hair Geometry from Multiple Images", 2004, ACM Transactions on Graphics, vol. 23 Issue 3, pp. 712-719.*
Paris et al., "Hair Photobooth: Geometric and Photometric Acquisition of Real Hairstyles", 2008, ACM Transactions on Graphics, vol. 27, Issue 3, Article No. 30, pp. 1-9.*
Liu et al., "Paint Selection", Aug. 2009, ACM Transactions on Graphics, vol. 28, No. 3, Article 69, pp. 69:1-69:8.*
Chai et al., "Single-view hair modeling for portrait manipulation", Jul. 2012, ACM Transactions on Graphics, vol. 31, No. 4, Article 116, pp. 116:1-116:8.*
Arjun Jain et al., "MovieReshape: Tracking and Reshaping of Humans in Videos" ACM Transactions on Graphics (TOG)—Proceedings of ACM SIGGRAPH Asia, vol. 29, Issue 6, Dec. 2010, Article No. 148.
Byong Mok Oh et al., "Image-Based Modeling and Photo Editing" SIGGRAPH '01 Proceedings of the 28th annual conference on Computer graphics and interactive techniques, pp. 433-442.
Daniel Vlasic et a., "Face Transfer with Multilinear Models" Proceedings, ACM SIGGRAPH 2006 Courses, Article No. 24.
Derek Hoiem et al., "Automatic Photo Pop-up" ACM Transactions on Graphics (TOG)—Proceedings of ACM SIGGRAPH 2005, vol. 24 Issue 3, Jul. 2005, pp. 577-584.
Dmitri Bitouk et al., "Face Swapping: Automatically Replacing Faces in Photographs" Journal—ACM Transactions on Graphics (TOG)—Proceedings of ACM SIGGRAPH 2008, vol. 27, Issue 3, Aug. 2008, Article No. 39.
Fei Yang et al., "Expression Flow for 3D-Aware Face Component Transfer" Journal—ACM Transactions on Graphics (TOG)—Proceedings of ACM SIGGRAPH 2011, vol. 30, Issue 4, Jul. 2011, Article No. 60.
Jiangyu Liu et al., "Paint Selection" Journal—ACM Transactions on Graphics (TOG)—Proceedings of ACM SIGGRAPH 2009, vol. 28, Issue 3, Aug. 2009 , Article No. 69.
Kelly Ward et al., "A Survey on Hair Modeling: Styling, Simulation, and Rendering" Journal—IEEE Transactions on Visualization and Computer Graphics, vol. 13, Issue 2, Mar. 2007, pp. 213-234.
Kevin Dale et al., "Video Face Replacement" Journal—ACM Transactions on Graphics (TOG)—Procedings of ACM SIGGRAPH Asia 2011, vol. 30, Issue 6, Dec. 2011, Article No. 130.
Kevin Karsch et al., "Rendering Synthetic Objects into Legacy Photographs" Journal—ACM Transactions on Graphics (TOG)—Proceedings of ACM SIGGRAPH Asia 2011, vol. 30, Issue 6, Dec. 2011, Article No. 157.
Linjie Luo et al., "Multi-View Hair Capture using Orientation Fields" Proceedings of the 2012 IEEE Conference on Computer Vision and Pattern Recognition (CVPR), pp. 1490-1497.
Li Xu et al., "Motion Detail Preserving Optical Flow Estimation" Journal—IEEE Transactions on Pattern Analysis and Machine Intelligence, vol. 34 Issue 9, Sep. 2012, pp. 1744-1757.
Lvdi Wang et al., "Example-Based Hair Geometry Synthesis" Journal—ACM Transactions on Graphics (TOG)—Proceedings of ACM SIGGRAPH 2009, vol. 28, Issue 3, Aug. 2009, Article No. 56.
Manuel Lang et al., "Practical Temporal Consistency for Image-Based Graphics Applications" Journal—ACM Transactions on Graphics (TOG)—Proceedings of ACM SIGGRAPH 2012, vol. 31, Issue 4, Jul. 2012, Article No. 34.
Menglei Chai et al., "Single-View Hair Modeling for Portrait Manipulation" Journal—ACM Transactions on Graphics (TOG)—Proceedings of ACM SIGGRAPH 2012, vol. 31 Issue 4, Jul. 2012, Article No. 116.
Nicolas Bonneel et al., "Single Photo Estimation of Hair Appearance" Eurographics Symposium on Rendering, 2009, vol. 28, No. 4, pp. 1171-1180.
Qing Zhang et al., "Simulation Guided Hair Dynamics Modeling from Video" Journal—Computer Graphics Forum, vol. 31, No. 7, Sep. 2010, pp. 2003-2010.
Sylvain Paris et al., "Capture of Hair Geometry from Multiple Images" Journal—ACM Transactions on Graphics (TOG)—Proceedings of ACM SIGGRAPH 2004, vol. 23 Issue 3, Aug. 2004 , pp. 712-719.
Sylvain Paris et al., "Hair photobooth: Geometric and Photometric Acquisition of Real Hairstyles" Journal—ACM Transactions on Graphics (TOG)—Proceedings of ACM SIGGRAPH 2008, vol. 27, Issue 3, Aug. 2008 , Article No. 30.
Tatsuhisa Yamaguchi et al., "Video-Based Modeling of Dynamic Hair" Proceedings of the 3rd Pacific Rim Symposium on Advances in Image and Video Technology, pp. 585-596.
Thabo Beeler et al., "Coupled 3D Reconstruction of Sparse Facial Hair and Skin" Journal—ACM Transactions on Graphics (TOG)—Proceedings of ACM SIGGRAPH 2012, vol. 31 Issue 4, Jul. 2012, Article No. 117.
Volker Blanz et al., "A Morphable Model for the Synthesis of 3D Faces" Proceedings of the 26th annual conference on Computer graphics and interactive techniques, pp. 187-194.
Wenzel Jakob et al., "Capturing Hair Assemblies Fiber by Fiber" Journal—ACM Transactions on Graphics (TOG)—Proceedings of ACM SIGGRAPH Asia 2009, vol. 28 Issue 5, Dec. 2009, Article No. 164.
Yichen Wei et al., "Modeling Hair from Multiple Views" Journal—ACM Transactions on Graphics (TOG)—Proceedings of ACM SIGGRAPH 2005, vol. 24 Issue 3, Jul. 2005 , pp. 816-820.
Youyi Zheng et al., "Interactive Images: Cuboid Proxies for Smart Image Manipulation" Journal—ACM Transactions on Graphics (TOG)—Proceedings of ACM SIGGRAPH 2012, vol. 31 Issue 4, Jul. 2012, Article No. 99.

(56) References Cited

OTHER PUBLICATIONS

Shizhe Zhou et al., "Parametric Reshaping of Human Bodies in Images" Journal—ACM Transactions on Graphics (TOG)—Proceedings of ACM SIGGRAPH 2010, vol. 29 Issue 4, Jul. 2010, Article No. 126.
Chai, Menglei et al., "Single-View Hair Modeling for Portrait Manipulation" ACM Transactions on Graphics, vol. 31, No. 4, (2012), pp. 1-8.

* cited by examiner

METHOD FOR IMAGE AND VIDEO VIRTUAL HAIRSTYLE MODELING

CROSS-REFERENCE TO RELATED APPLICATIONS

This application is a continuation of International Application No. PCT/CN2013/075129, filed on May 3, 2013, which claims priority to Chinese Patent Application No. 201310047151.8, filed on Feb. 2, 2013, both of which are hereby incorporated by reference in their entireties.

TECHNICAL FIELD

The present invention relates to the field of virtual individual modeling and image and video editing, and in particular, to a method for virtual individual hairstyle modeling and, image and video hairstyle editing.

BACKGROUND

The background pertaining to the present invention is described in brief as follows:

I. Hairstyle Modeling of Virtual Individuals

Although in practical applications in the industry, a lot of softwares are available for assisting creators to accomplish manual virtual hairstyle modeling, those softwares are often complex and time-consuming, and require proficient skills and complicated manual manipulations, thereby prolonging the creating period of products and increasing costs (WARD, K., BERTAILS, F., KIM, T. -Y., MARSCHNER, S. R., CANI, M. -P., AND LIN, M. C. 2007. A survey on hair modeling: styling, simulation, and rendering. IEEE Transactions on Visualization and Computer Graphics 13, 2, 213-234.). Therefore, on this basis, some prior methods try to capture real hairstyle images to synthesize realer hairstyle model and decrease workloads, however, a majority of such image-based modeling methods may obtain an enough real 3D hairstyle structure when a plurality of images under different illumination, different viewpoints or different focal distances are captured (PARIS, S., BRICENO, H., AND SILLION, F. 2004. Capture of hair geometry from multiple images. ACM Trans. Graph. 23, 3, 712-719.; WEI, Y., OFEK, E., QUAN, L., AND SHUM, H. -Y. 2005. Modeling hair from multiple views. ACM Trans. Graph. 24, 3, 816-820.; PARIS, S., CHANG, W., KOZHUSHNYAN, O. I., JAROSZ, W., MATUSIK, W., ZWICKER, M., AND DURAND, F. 2008. Hair photobooth: geometric and photometric acquisition of real hairstyles. ACM Trans. Graph. 27, 3, 30:1-30:9.; JAKOB, W., MOON, J. T., AND MARSCHNER, S. 2009. Capturing hair assemblies fiber by fiber. ACM Trans. Graph. 28, 5, 164:1-164:9.).

Bonneel et al. have proposed an estimation method for hairstyle appearance, which is used to obtain a statistically analogous 3D hairstyle model from a single image shot by an indoor flashlight (BONNEEL, N., PARIS, S., PANNE, M. V. D., DURAND, F., AND DRETTAKIS, G. 2009. Single photo estimation of hair appearance. Computer Graphics Forum 28, 1171-1180.), but the hairstyle model synthesized by this method cannot fit an individual hairstyle in the original image on pixel level, which is thereby not applicable in image hairstyle editing applications. Luo et al. have found that strand orientation features are usually more reliable than pixel colors of original images, so orientation information is used to estimate more accurate hairstyle volume in multi-view hairstyle modeling (LUO, L., LI, H., PARIS, S., WEISE, T., PAULY, M., AND RUSINKIEWICZ, S. 2012. Multi-view hair capture using orientation fields. In Proc. CVPR 2012.), however, the hairstyle generated by adopting this method is represented in polygon grids, which does not conform to the quality requirements of hairstyle model in the digital media industry. Beeler et al. have proposed a method for simultaneously capturing sparse facial hair and occluded skin surface (BEELER, T., BICKEL, B., NORIS, G., BEARDSLEY, P., MARSCHNER, S., SUMNER, R. W., AND GROSS, M. 2012. Coupled 3D reconstruction of sparse facial hair and skin. ACM Trans. Graph. 31, 4.), the high quality modeling result obtained in this method has proved the importance of hairs in portraying the authenticity of virtual characters, however, this method can merely be applied to sparse and shorter hairs on faces, such as beards and eyebrows, but cannot be applied to common hairs.

Comparing with static hairstyle modeling, dynamic hairstyle modeling for a video is more complex, which is still an unsolved problem in the art. Yamaguchi et al. have extended the multi-view hairstyle modeling method (WEI, Y., OFEK, E., QUAN, L., AND SHUM, H. -Y. 2005. Modeling hair from multiple views. ACM Trans. Graph. 24, 3, 816-820.) directly to process the video (YAMAGUCHI, T., WILBURN, B., AND OFEK, E. 2009. Video based modeling of dynamic hair. In the 3rd Pacific Rim Symposium on Advances in Image and Video Technology, 585-596.). Zhang et al. have further used physics-based movement simulation to refine initially reconstructed hairstyle model sequence. The dynamic hairstyle model obtained by combining multiple viewpoints in these methods would over restraint the movement of the hairstyle for lack of accurate correspondence of strands, which thereby leads to the result of excessive smoothness and sever deviation from real situations.

II. Image Editing under the Guidance of 3D Information

In digital image editing applications directed to individual entertainment industry, a user's input is usually an arbitrary single view. The reconstruction of an accurate 3D model from the single view is an uncertain problem due to the lack of accurate 3D information, however, it has been proved by some prior methods that the applicable range of possible image editing manipulations is widely extended by adopting proper certain 3D proxies (proxy). Differing from usual image-based modeling techniques, these 3D proxies are always designed to better portray and represent mutual structures for certain types of objects, but may not fit shapes of real objects accurately.

Aiming at common scenario images, prior methods adopted in the industry include a layered depth map (OH, B. M., CHEN, M., DORSEY, J., AND DURAND, F. 2001. Image-based modeling and photo editing. In Proc. SIGGRAPH, 433-442.), image pop-up using plane billboard constructions (HOIEM, D., EFROS, A. A., AND HEBERT, M. 2005. Automatic photo pop-up. ACM Trans. Graph. 24, 3, 577-584.), synthetic object insertion with cuboid proxies (KARSCH, K., HEDAU, V., FORSYTH, D., AND HOIEM, D. 2011. Rendering synthetic object into legacy photographs. ACM Trans. Graph. 30, 6, 157:1-12.), and semantic editing of existed object in image (ZHENG, Y., CHEN, X., CHENG, M. -M., ZHOU, K., HU, S. -M., AND MITRA, N. J. 2012. Interactive images: Cuboid proxies for smart image manipulation. ACM Trans. Graph. 31, 4.), the 3D proxies of these methods for roughly representing general 3D information of the scenario, which are usually simple and always have fairly limited effects, are usually applied to film pop-up processing and etc.

There are more effective 3D proxy methods for certain human body objects in images. Blanz and Vetter have proposed a method for fitting a parameterized morphable head model (morphable head model) using human face regions in images (BLANZ, V., AND VETTER, T. 1999. A morphable model for the synthesis of 3D faces. In Proc. SIGGRAPH '99.), this 3D human face model with low parametric dimension may be applied to realer expression transfer (expression transfer)(YANG, F., WANG, J., SHECHTMAN, E., BOURDEV, L., AND METAXAS, D. 2011. Expression flow for 3D-aware face component transfer. ACM Trans. Graph. 30, 4, 60:1-60:10.) and face swapping (BITOUK, D., KUMAR, N., DHILLON, S., BELHUMEUR, P. N., AND NAYAR, S. K. 2008. Face Swapping: Automatically replacing faces in photographs. ACM Trans. Graph. 27, 39:1-39:8.; DALE, K., SUNKAVALLI, K., JOHNSON, M. K., VLASIC, D., MATUSIK, W., AND PFISTER, H. 2011. Video face replacement. ACM Trans. Graph. 30, 6, 130:1-130:10.). Similarly, parametric reshaping of human bodies in images and videos can be realized by adopting 3D morphable head models of full bodies (ZHOU, S., FU, H., LIU, L., COHEN-OR, D., AND HAN, X. 2010. Parametric reshaping of human bodies in images. ACM Trans. Graph. 29, 4, 126:1-126:10.; JAIN, A., THORMAHLEN, T., SEIDEL, H. -P., AND THEOBALT, C. 2010. MovieReshape: Tracking and reshaping of humans in videos. ACM Trans. Graph. 29, 6, 148:1-148:10.). These methods may be applied to special effect making in films and image editing and processing and etc. However, what should be noted is that, there are usually more apparent common features in human faces, bodies and other parts, whose parametric fitting is much easier, than in hairstyles.

Chai et al. have recently proposed a single-view 3D hairstyle reconstruction method (CHAI, M., WANG, L., YU, Y., WENG, Y., GUO, B., AND ZHOU, K. 2012. Single-view hair modeling for portrait manipulation. ACM Trans. Graph. 31, 4, 116:1-8.) aiming at 3D proxies of hairstyles. However, this method ,which cannot generate a 3D hairstyle model with physical rationality, merely fits hairstyle regions in original images according to numerous spatial strands, and thereby results of this method are difficult to be directly applied to related applications of the industry.

SUMMARY

The present invention aims at providing a method for image and video hairstyle modeling with respect to the deficiency of the prior art. The method may perform 3D model reconstruction with physical rationality for individual hairstyles in single-views and video sequences, and may be widely applied in creating virtual characters and many hairstyle editing applications of images and videos, such as portrait pop-up, hairstyle movement simulation and interactive hairstyle editing, etc., in the industries of digital media and etc., having high practical value.

The goal of the present invention is accomplished by the following technical solutions: a method for image and video virtual hairstyle modeling, which includes steps as follows:

(1) data acquisition and preprocessing of a hairstyle image: performing data acquisition for a target subject by using a digital device, where clearness and integrity of a hairstyle part are required, and obtaining a hairstyle region from the image by segmenting with a paint selecting tool;

(2) image-based calculation of a hairstyle orientation field: solving an orientation ambiguity problem of an image hairstyle orientation field, solving a spatial hairstyle orientation field by combining the unambiguous image hairstyle orientation field with a spatial hair volume region;

(3) iterative construction of a static hairstyle model: by referring a scalp region which is defined on a fitted individual head model as a hair root location, starting to grow from a hair root sampling point in the spatial hairstyle orientation field to obtain an initial hairstyle model, and obtaining a uniformly distributed static hairstyle model which conforms to the original hairstyle region by refining the initial result iteratively;

(4) video-based dynamic hairstyle modeling: based on the static hairstyle model obtained in step 3, calculating a movement of the hairstyle in a video by tracing a movement of a head model and estimating non-rigid deformation, generating a dynamic hairstyle model in every moment during the moving process, so that the dynamic hairstyle model fits naturally with the real movement of the hairstyle in the video;

(5) exporting of the hairstyle modeling result: exporting and storing the modeling result in the aforementioned steps, where the modeling result includes the static hairstyle model obtained in step 3 and the dynamic hairstyle model obtained in step 4.

The beneficial effects of the present invention are: the present invention performs 3D model reconstruction with physical rationality for individual hairstyles in single-views and video sequences, and may be widely applied in creating virtual characters and hairstyle editing of images and videos in the digital media and its relative industries. The present invention proposes, for the first time, an image-based 3D modeling method with physical rationality for complex hairstyles, which fits well with hairstyle regions of original images and meanwhile ensures that generated hairstyle models are in accordance with their original physical features, namely, the hairstyle models, with proper and continuous length and geometrical features, are constructed by strand curves grown from hair root locations in scalp regions. In contrast to existing image-based 3D hairstyle modeling techniques, the method can obtain a hairstyle model with higher quality, and thereby meets the needs of models in many complex dynamic hairstyle editing applications, and can be applied to more application fields and achieve effects unapproachable by adopting existing methods.

DESCRIPTION OF EMBODIMENTS

Figure 1:
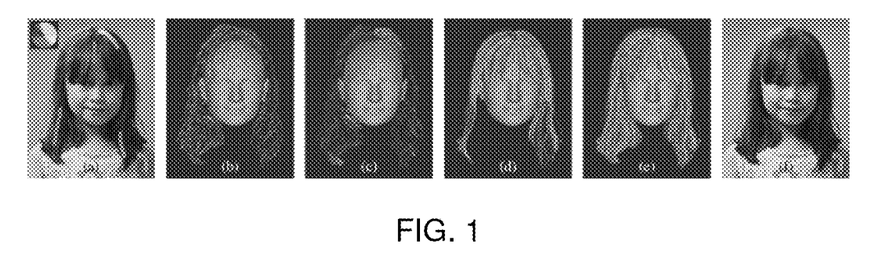
FIG. 1 is a schematic diagram of a hairstyle modeling process according to the present invention, in this figure, (a) shows an original captured image and user brushes, (b) shows initial strands, (c) shows strands after solving orientations, (d) shows an initial hairstyle model, (e) shows a hairstyle model after iteration for the first time, (f) shows a rendered result of the final model.
Figure 2:
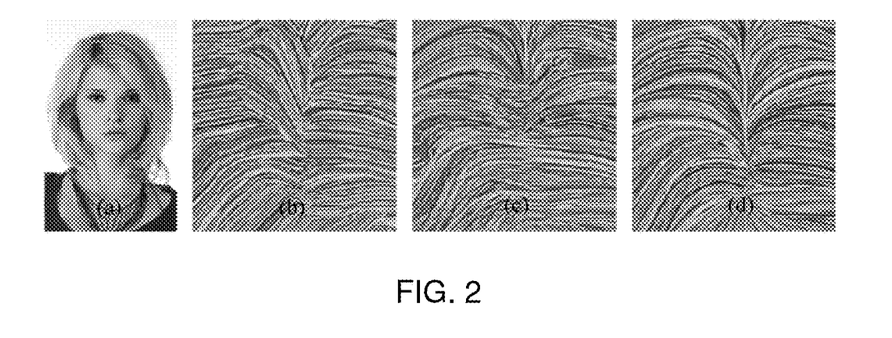
FIG. 2 is a comparison diagram of the present invention and existing methods according to a static hairstyle modeling, in this figure, (a) shows an original captured image, (b) shows a result obtained by adopting an orientation field method, (c) shows a result obtained by adopting a structure tensor method with orientation ambiguity, (d) shows a result obtained by adopting this method.
Figure 3:
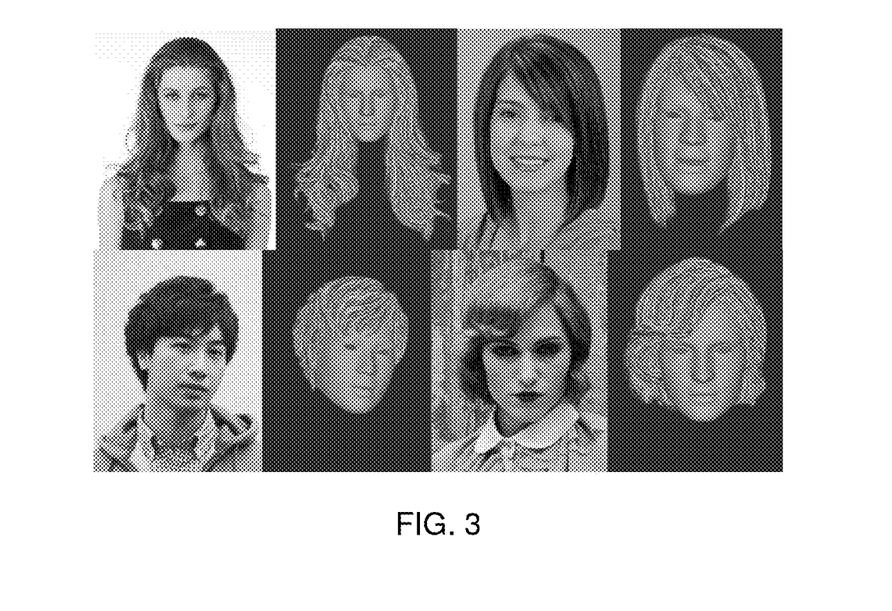
FIG. 3 is a schematic diagram of some modeling results according to the present invention.
Figure 4:
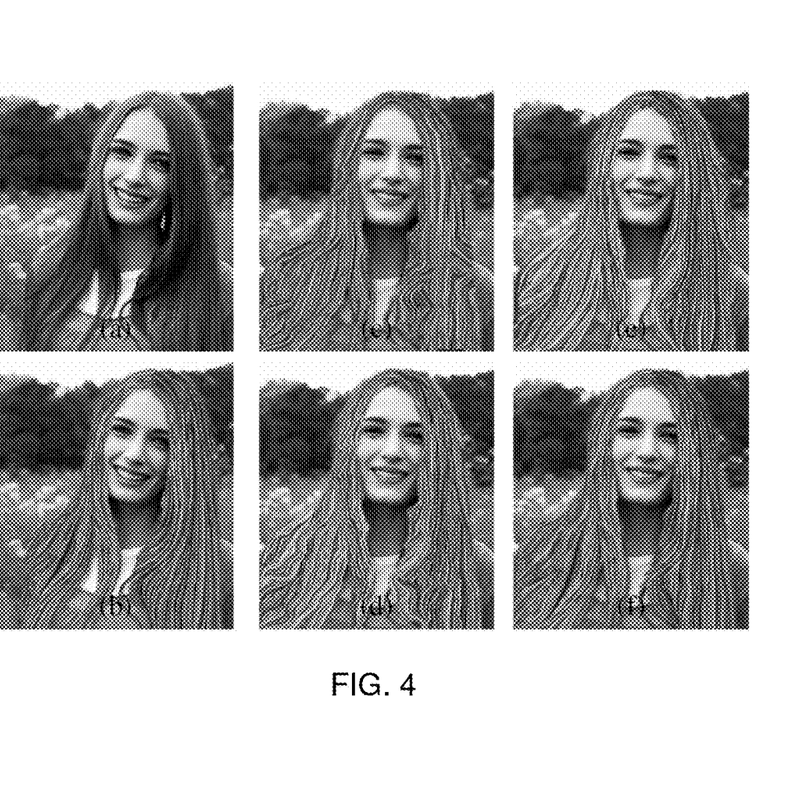
FIG. 4 is a comparison diagram of the present invention and existing methods according to a dynamic hairstyle modeling, in this figure, (a) (b) show an original captured image and an initial hairstyle modeling result, (c) shows a result obtained by adopting a model that is not in accordance with physical rationality, (d) shows a result obtained by merely adopting a feature field, (e) shows a result obtained by merely adopting an optical flow field, (f) shows a result obtained by adopting this method.
Figure 5:
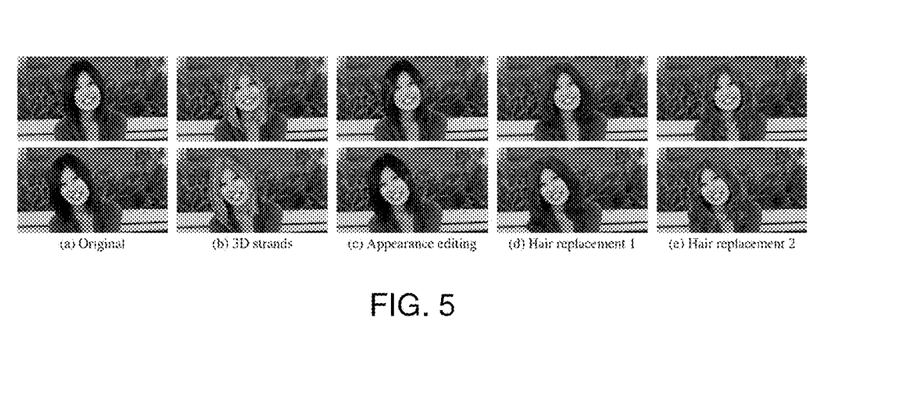
FIG. 5 is a schematic diagram of some video hairstyle editing applications according to the present invention.

The core technology of the invention is to perform 3D model reconstruction with physical rationality for virtual hairstyle objects in single-views and video sequences. The method is mainly composed of five major parts: data acquisition and preprocessing of a hairstyle image, image-based calculation of a hairstyle orientation field, iterative construction of a static hairstyle model, video-based dynamic hairstyle modeling, and exporting and application of the hairstyle modeling result.

1. Data acquisition and preprocessing of a hairstyle image: performing data acquisition on a target subject by using a digital device, where clearness and integrity of the hairstyle part are required, and obtaining a hairstyle region from the image by segmenting with a paint selecting tool.

1.1 Image Capture

This method is applicable to common digital photos and video data. As input data, this method needs to shoot and video-record real human objects by using digital devices including common digital cameras, digital videos, cellphones and other digital devices with shooting and video-recording functions to obtain the original input data. Since main operated objects of this method are hairstyle objects of human in images and videos, clearness and integrity of the hairstyle region in the image are required in this step.

1.2 User-Assisted Interaction

Due to complex shape features existing in content and the boundary of the hairstyle region in the image, automatic recognition and segmentation may be difficult to be stably performed, therefore, data preprocessing is performed in this method according to a small number of user-assisted interaction, so as to facilitate subsequent steps. By means of paint selection (paint selection) technique (LIU, J., SUN, J., AND SHUM, H. -Y. 2009. Paint selection. ACM Trans. Graph. 28, 3, the content of which is hereby incorporated by reference in its entirety.), the image is segmented with a small number of strokes in the hairstyle region, and the hairstyle region $R_{hair}$ is obtained.

2. Image-based calculation of a hairstyle orientation field: solving an orientation ambiguity problem of an image hairstyle orientation field, solving a spatial hairstyle orientation field by combining the unambiguous image hairstyle orientation field with a spatial hair volume region.

2.1 Head Model Fitting

This method adopts a head model locating and fitting technique based on image feature points and a training database (CHAI, M., WANG, L., YU, Y., WENG, Y., GUO, B., AND ZHOU, K. 2012. Single-view hair modeling for portrait manipulation. ACM Trans. Graph. 31, 4, 116:1-8; the content of which is hereby incorporated by reference in its entirety.), which locates facial feature points automatically by means of ASM (active shape model) method, and then estimates head transformation parameters and meanwhile fits a 3D head model of the image by least squares optimization based on these feature points and the 3D head model database after principle component analysis (principle component analysis) dimension reduction (adopting FaceGen software internal data).

2.2 Non-Oriented 2D Strand Tracing

This method uses a series of oriented filtering functions $\{K_\theta\}$ to perform filtering manipulation for the hairstyle region $R_{hair}$ obtained in step 1.2, where each filtering function $K_\theta$ is used for detecting a response value of the orientation corresponding to the angle θ. Let $F(x, y, \theta)=(K_\theta * I)_{(x, y)}$ represent the response value of $K_\theta$ at the pixel (x,y). Then the local orientation at the pixel (x,y) is $\tilde{\theta}_{(x,y)}=\text{argmax}_\theta (F(x,y,\theta))$, and the confidence in the local orientation is obtained as $w_{(x,y)}=F(x, y, \tilde{\theta}_{(x,y)})/\Sigma F(x, y, \theta)$. Based on the 2D orientation field, the local maximum value point P of the confidence $w_{(x,y)}$ inside the hairstyle region is selected as a seed point satisfying:

$$\frac{w_P - \max(w_{P_L}, w_{P_R})}{w_P} > \grave{o},$$

$$w_P > w_{high};$$

Where $w_{P_L}$ and $w_{P_R}$ are near confidences sampled by the bilinear interpolation method in opposite directions along the line passing P and perpendicular to the local orientation $\tilde{\theta}_P$. Let $w_{high}=0.3$, $w_{low}=0.05$, $\grave{o}=0.2$ with respect to a regular image.

For any selected seed point $P_{seed}$ and its local orientation $\tilde{\theta}_{P_{seed}}$, this method simultaneously carries out strand tracing in both opposite directions. Similar to methods in the prior art, each step of strand tracing extends a curve forward along the direction $V_P$ corresponding to the angle $\tilde{\theta}_P$ at the current location P:

$$P_{i+1}=P_i+\delta v_{P_i};$$

Finally, a series of non-oriented 2D strands are obtained.

2.3 Solving Orientation Ambiguity

In this method, each curve $\gamma_i$ of the non-oriented 2D strands obtained in step 2.2 is represented as a uniformly distributed strand vertex list, where $\gamma_{i(j)}$ represents the $j^{th}$ vertex of $\gamma_i$. An original strand orientation $\hat{t}_{i(j)}$ at $\gamma_{i(j)}$ may be defined as a unit vector orienting from $\gamma_{i(j-1)}$ to $\gamma_{i(j+1)}$. In step 2.2, the orientation of the initial 2D strands are all randomly assigned, the growth orientation of the strands may be represented as $\hat{t}_{i(j)}=s_i\hat{t}_{i(j)}$, where $s_i\in\{-1,1\}$. Similarly, the user interactive stroke in step 1.2 may also be represented as the same strand orientation, however, since it is accurate, we replace $s_i$ with a global parameter $w_m=10$.

Define a fraction P for each strand curve $\gamma_i$ as:

$$P(\gamma_i) = \sum_j \sum_{\gamma_{p(q)}\in N_{i(j)}} \hat{t}_{i(j)} \cdot \hat{t}_{p(q)}$$

Where $N_{i(j)}$ includes all the strand vertices near $\gamma_{i(j)}$ locating on different strands with solved orientations. Solving the following binary integer programming (binary integer programming) problem:

$$\underset{\{s_i\}}{\text{argmax}}\sum_i P(\gamma_i)$$

This method approximately solves this NP-complete problem (NP-complete problem) according to the following greedy algorithm: dividing all the strands into three sets, which are solved, solving and unsolved, when the algorithm starts, both the solving and unsolved sets are empty, and the solved set merely contains users' assisted strokes. The following steps of the algorithm are executed repeatedly until all the strands are solved:

(1) selecting every unsolved strand $\gamma_{i(j)}$ which is near any one of the solved strand vertices, and moving them into the heap (heap) construction formed by the solving set, and letting $|P_{(\gamma_i)}|$ be their score;

(2) selecting $\gamma_i$ which has the maximum score among the strands in the solving set, selecting $s_i \in \{-1,1\}$ so that $P(\gamma_i)$ is not negative, and moving $\gamma_i$ to the solved set;

(3) updating scores of all the solving strands near $\gamma_i$ which has been moved to the solved set in step (2). 2.4 Hair Volume Construction This method adopts a single viewpoint hairstyle modeling method (CHAI, M., WANG, L., YU, Y., WENG, Y., GUO, B., AND ZHOU, K. 2012. Single-view hair modeling for portrait manipulation. ACM Trans. Graph. 31, 4, 116:1-8; the content of which is hereby incorporated by reference in its entirety.) to solve depth information of the 2D strands, construct a region definition H $\epsilon^3$ of a hair volume (hair volume) in the space as the closed hairstyle region minus the region where the head model locates in step 2.1.

2.5 Solving a Spatial Hairstyle Orientation Field

Inside the hair volume H obtained in step 2.4, constructing a uniform spatial grid, solving a discrete spatial vector field D with no orientation ambiguity according to the following optimization method: let the 3D orientation vector at the grid unit i be $v_i$, the optimized energy equation is represented as:

$$E_d(D) = \sum_{i \in H} \|\Delta v_i\|^2 + w_c \sum_{i \in C} \| v_i - c_i\|^2$$

Where $\Delta$ is the Laplacian operator (Laplacian operator), C is the set of all the grid units with an orientation constraint $C_i$, $w_c$ is a parameter controlling the constraint weights, in this method, let $w_c=10$. Define the orientation constraint as: projecting all the 2D oriented strand curves on the boundary surface of H, storing the generated tangent vectors of the 3D curves at the grid units where the 3D curves locate. In the meantime, let the constraint orientations of all the grids near the scalp region be the normal vectors of the scalps where the grids locate.

3. Iterative construction of a static hairstyle model: by referring a scalp region which is defined on a fitted head model as a hair root location, starting to grow from a hair root sampling point in the spatial hairstyle orientation field to obtain an initial hairstyle model, and obtaining a uniformly distributed static hairstyle model which conforms to the original hairstyle region by refining the initial result iteratively.

3.1 Scalp Parameterization

As the start of constructing the static hairstyle model, firstly, this method defines a scalp region where the hair root distributes according to the fitted hair model in step 2.1, in order to make the scalp region conform to the hairstyle region in specific images, further excludes the intersection part of the scalp region and the hairstyle region. Applying a method of (WANG, L., YU, Y., ZHOU, K., AND GUO, B. 2009. Example-based hair geometry synthesis. ACM Transactions on Graphics 28, 3, 56:1-9.) in the 2D parametric space corresponding to the scalp region to obtain a hair root location $n_s$ by uniformly sampling, and projecting the hair root location back into 3D space.

3.2 Construction of an Initial Model

Starting from the hair root location on the parameterized scalp obtained in step 3.1, by adopting a second-order Runge-Kutta (second-order Runge-Kutta) method according to the spatial hairstyle orientation field obtained in step 2.5, prolonging the initial strands until their lengths extend a specific maximum strand length or cross the boundary of H, and finally obtaining a set S with a series of initial strands as the initial static hairstyle model.

3.3 Iterative Refinement

Given the initial static hairstyle model S obtained in step 3.2, this method iteratively adds new strands to fill up the blank region of H, so that the final hairstyle model is as reliable as the initial model both visually and physically. The basic process of the iteration is: 1) generating an alternative strand set S* by randomly selecting sampling points in the blank region of H; 2) examining whether proper strand part $\xi \in S$ near $\xi^*$ exists for each alternative strand $\xi^* \in S^*$, if yes, cutting and regrouping $\xi$ and $\xi^*$ to generate a combined new strand $\xi'$, and adding the combined new strand into S. Repeating these two steps until no proper alternative strand can be used.

Let $\|\xi\|$ represent the number of vertices in strand $\xi$, $\xi_{(i)}$ is the $i^{th}$ vertex of $\xi$ (starting counting from the hair root). Searching respectively two space-adjacent vertices) $\xi_{(i)}$ and $\xi^*_{(j)}$ of a pair of the existed strand $\xi$ and the alternative strand $\xi$ during the cutting and regrouping process, and generating a new strand $\xi'$ so that:

$$\xi'_{(k)} = \begin{cases} \xi_{(k)} & \text{if} \quad k < i, \\ (\xi_{(i)} + \xi^*_{(j)})/2 & \text{if} \quad k = i, \\ \xi^*_{(k-i+j)} & \text{if} \quad i < k < i + |\xi^*| - j. \end{cases}$$

Where the part of $\xi'$ which is near the hair root always comes from existed strands, so that $\xi_{(1)}$ locates on the surface of the scalp. In order to select proper strands $\xi \in S$ and corresponding vertices to perform cutting and regrouping, this method defines an energy equation corresponding to the weighing standard as:

$$E_c(\xi') = \sum_k e^{-\frac{(k-i)^2}{2\sigma_c^2}} \Delta \xi'_{(k)} + w_\rho \sum_k \rho(\xi'_{(k)})$$

Where the Laplacian operator $\Delta$ of the vertex $\xi'_{(k)}$ reflects the smoothness level near a connection point according to a weighted geodesic distance to $\xi'_{(i)} \cdot \rho(\xi'_{(k)})$ represents a strand dense value of the neighboring region of $\xi'_{(k)}$. This method uses $\sigma_c = 1$ and a dense weight $w_\rho = 0.01$. For each alternative strand, this method traverses, according to a predefined searching radius, all adjacent vertices in S to find a connection point that minimizes the energy. To increase the smoothness level of the connected new strand, this method applies a low-pass filter (low-pass filter) on the vertices near the connection point in $\xi'$ to obtain a refined static hairstyle model.

4. Video-based dynamic hairstyle modeling: based on the static hairstyle model obtained in step 3, calculating the movement of the hairstyle in the video by tracing the movement of the head model and estimating non-rigid deformation, generating a dynamic hairstyle model in every moment during the moving process, so that the dynamic hairstyle model fits naturally with the real movement of the hairstyle in the video.

4.1 Construction of an Initial Model

Firstly, selecting a certain initial frame r of an input video sequence to apply the method described in step 1~3 to construct a static hairstyle model $S_r$ at this moment.

4.2 Head Movement Tracing

This method uses a multilinear model (Multilinear model) (VLASIC, D., BRAND, M., PFISTER, H., AND POPOVIC, J. 2005. Face transfer with multilinear models. ACM Trans. Graph. 24, 3, 426-433.; DALE, K., SUNKAVALLI, K., JOHNSON, M. K., VLASIC, D., MATUSIK, W., AND PFISTER, H. 2011. Video face replacement. ACM Trans. Graph. 30, 6, 130:1-130:10.) to trace the movement $M_i$ of the head in the video as rigid transformation (rigid transformation) at moment $T_i$.

4.3 Calculation of an Optical Flow Field

For non-rigid transformation (non-rigid transformation) of the hairstyle, firstly, this method uses a method of (LI, X., JIA, J., AND MATSUSHITA, Y. Motion detail preserving optical flow estimation. TPAMI 34.9 1744-1757.) to calculate the dense optical flow field $V_i$ (optical flow) from moment $T_{i-1}$ to $T_i$ (a 2D location p at moment $T_{i-1}$ corresponds to a location $p+V_i(p)$ at moment $T_i$).

4.4 Calculation of a Feature Field

Due to error accumulations, the optical flow field becomes more and more inaccurate as time passes by, especially at the location near the boundary of the hairstyle region. To correct this problem, this method starts tracing a few reliable feature points from the initial frame r in addition, these feature points may be detected by Kanade-Lucas-Tomasi method automatically, or may be assigned by users manually. And then, diffusing, by means of maintaining the boundary, the sparse feature correspondence to the whole image region (LANG, M., WANG, O., AYDIN, T., SMOLIC, A., AND GROSS, M. 2012. Practical temporal consistency for image-based graphics applications. ACM Trans. Graph. 31, 4.) to calculate a 2D warping flow (warping flow) $W_i^\dagger$ from the initial frame r to each of other frames i. In some situations, on account of the tracing bias resulted from movement obscuring, occluding or other reasons, this method allows users to interactively adjust the location of the feature points in a frame and transfer these corrections to the whole sequence smoothly to obtain the accurate feature field.

4.5 Dynamic Strand Deformation

Based on the rigid transformation, the optical flow field, and the feature filed respectively calculated in step 4.2, 4.3, 4.4, this method performs transformation for all the strand vertices in a frame and obtains the dynamic hairstyle model at the current moment.

Firstly, combining the optical flow field and the feature field to define the non-rigid deformation field $W_i^*$ as:

$$W_i^*(p)=0.5W_i^\dagger(p)+0.5[W_{i-1}^*(p)+V_i(p+W_{i-1}^*(p))]W_r^*$$
$$(p)=W_r^\dagger(p)=V_r(p)=0$$

Let $v_r$ and $p_r$ be respectively the 3D location of the strand vertices and the projection location on the XY plane in the initial hairstyle model. To calculate the deformation location of the vertex at moment i, this method firstly uses the rigid transformation $M_i$ in step 4.2 to obtain $v_i'=M_i v_r$, so that the hairstyle model can better align to the movement of the head.

After that, calculating a 2D bias vector for $v_i'$:

$$W_i(v_i')=W_i^*(p_r)-(p_i'-p_r)$$

Where $p_i'$ represents the projection location of $v_i'$ on the XY plane.

Finally obtaining a dynamic vertex location as $v_i=v_i'+\beta W_i(v_i')$, where $\beta$ represents a weight function varying from 0 at the hair root to 1 at the hair tip in order to ensure that the hair root stays on the surface of the scalp forever.

5. Exporting and application of the hairstyle modeling result: exporting and storing the hairstyle modeling result in a general format, and importing the hairstyle modeling result to other multimedia, related applications of digital entertaining industrial system for subsequent uses.

5.1 Result Exporting

In steps 3 and 4 of this method, static and dynamic hairstyle models are respectively constructed for images and video data, which are compatible with general data formats in the industry, specifically, the hairstyle model data may be represented as a set of numerous strand curves, where every strand is constructed by a series of ordered vertices. As a mean of exporting the final result, this method stores the result as a relevant file format.

5.2 Application of the Result

As a general representation of a hairstyle object, the exported result in this method may be applied to all existing hairstyle application systems, which includes creation of virtual characters in film special effect and cartoon productions, image editing in multimedia applications, special effect productions, and hairstyle design and virtual synthesis in the virtual reality field and etc.

Implementing Instance

The inventor accomplishes embodiments of the present invention on a machine equipped with Intel Xeon E5620 central processor and NVidia GTX680 graphics processor. The inventor adopts all the parameters enumerated in the detailed description of the embodiments, and obtains all the experimental results as shown in drawings. All the generated hairstyle models include about 200 thousands to 400 thousands strand curves, each individual strand is represented as a line segment connected by a plurality of vertices, where the color of the vertices are sampled from the original image, in a real rendering process, these strands are extended, by a geometry shader, to polygon bands aligned to the screen, to perform real-time rendering.

The inventor invites some users to test the prototype system in the present invention. It turns out that only about 2 to 8 simple strokes are needed to perform interactive manipulations for a usual portrait by the user. For an image with the size of about 500×800, the system usually needs 2 minutes to perform the whole 3D modeling process.

What is claimed is:

1. A method for single view image and video virtual hairstyle modeling, comprising the following steps:
   (1) data acquisition and preprocessing of a single view hairstyle image: performing data acquisition on a target subject by using a digital device, and obtaining a hairstyle region from a single view image by segmenting with a paint selecting tool;
   (2) single view image-based calculation of a hairstyle orientation field: solving an orientation ambiguity problem of a single view image hairstyle orientation field, solving a spatial hairstyle orientation field by combining an unambiguous single view image hairstyle orientation field with a spatial hair volume region;
   (3) iterative construction of a static hairstyle model: by referring a scalp region which is defined on a fitted individual head model as a hair root location, starting to grow from a hair root sampling point in the spatial hairstyle orientation field to obtain an initial hairstyle model, and obtaining a uniformly distributed static hairstyle model which conforms to an original hairstyle region by refining an initial result iteratively, wherein the initial result is refined iteratively according to following means: obtaining an initial location of an alternative strand by sampling from a spatial hair volume, obtaining a series of alternative strands by means of bi-orientation tracing, and obtaining a refined static hairstyle model by cutting and regrouping the current hairstyle model and all the alternative strands;

(4) video-based dynamic hairstyle modeling: based on the static hairstyle model obtained in step 3, calculating a movement of the hairstyle in a video by tracing a movement of a head model and estimating non-rigid deformation, generating a dynamic hairstyle model in every moment during the moving process, so that the dynamic hairstyle model fits naturally with the real movement of the hairstyle in the video;

(5) exporting of the hairstyle modeling result: exporting and storing the modeling result in the aforementioned steps, wherein the modeling result comprises the static hairstyle model obtained in step 3 and the dynamic hairstyle model obtained in step 4.

2. The method for single view image and video virtual hairstyle modeling according to claim 1, wherein step (2) comprises following sub-steps:

(2.1) automatically fitting a 3D head model for a human head region in an input single view image;

(2.2) calculating a sparse single view image hairstyle orientation field in the hairstyle region segmented in step 1, and obtaining a series of 2D strand curves by tracing based on the sparse single view image hairstyle orientation field;

(2.3) solving orientation information of 2D strands, obtaining a 2D strand set with no orientation ambiguity;

(2.4) estimating depth information of strands and constructing the spatial hair volume by adopting 2D strands with no orientation ambiguity obtained in step 2.3 and the fitted head model obtained in step 2.1;

(2.5) constructing a spatial grid inside a hair volume of step 2.4, solving a spatial hairstyle orientation field defined on a grid unit.

3. The method for single view image and video virtual hairstyle modeling according to claim 2, wherein step (3) comprises following sub-steps:

(3.1) based on the fitted 3D head model obtained in step 2.1, performing 2D parametric construction for the scalp region thereon, and obtaining an initial location of a hair root by uniformly sampling;

(3.2) by referring the hair root in step 3.1 as a starting point and the spatial hairstyle orientation field obtained in step 2.5 as a growth orientation, defining and tracing all the strands till the end, and obtaining an initial static hairstyle model;

(3.3) performing iterative refinement according to the following means: obtaining the initial location of the alternative strand by sampling from the spatial hair volume, obtaining the series of alternative strands by means of bi-orientation tracing, and obtaining the refined static hairstyle model by cutting and regrouping the current hairstyle model and all the alternative strands.

4. The method for single view image and video virtual hairstyle modeling according to claim 1, wherein step (4) comprises following sub-steps:

(4.1) constructing the static hairstyle model for a reference frame in an input video sequence;

(4.2) obtaining a rigid transformation of each frame relative to the reference frame by tracing the movement of the head model;

(4.3) solving a dense optical flow field, which is from the reference frame to each frame, for the each frame in the video sequence;

(4.4) assigning locations of reliable feature points by means of detecting automatically or user assignment in the hairstyle region of the single view image, obtaining sparse feature correspondence by tracing these feature points, and diffusing the sparse feature correspondence to the whole single view image region by adopting a filtering method which maintains boundary to obtain a feature field;

(4.5) for each frame of the video sequence, firstly, performing 3D alignment for the hairstyle model obtained in step 4.1 according to the rigid transformation obtained in step 4.2, and then generating a 2D transformation field by combining the optical flow field obtained in step 4.3 and the feature field obtained in step 4.4, and obtaining the dynamic hairstyle model of the frame by performing transformation shift for all vertices of the hairstyle model after rigid alignment and by maintaining continuity of the strands.

* * * * *